March 9, 1954  P. DARGIER DE SAINT VAULRY  2,671,864
ELECTROMAGNETIC OSCILLATORY MOTOR Filed Dec. 22, 1949  3 Sheets-Sheet 1

INVENTOR
PAUL DARGIER DE SAINT VAULRY

Strauch & Hoffman
ATTORNEYS

INVENTOR
PAUL DARGIER DE SAINT-VAULRY

Strauch & Hoffman
ATTORNEYS

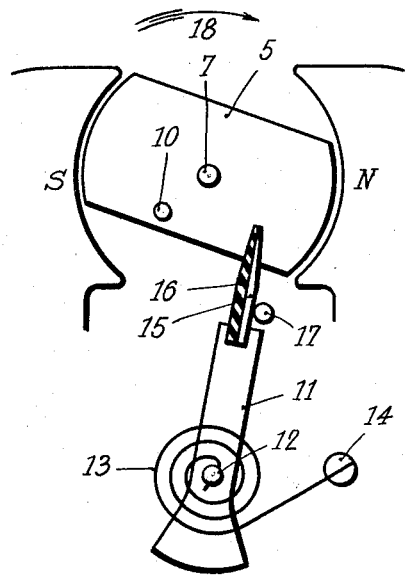
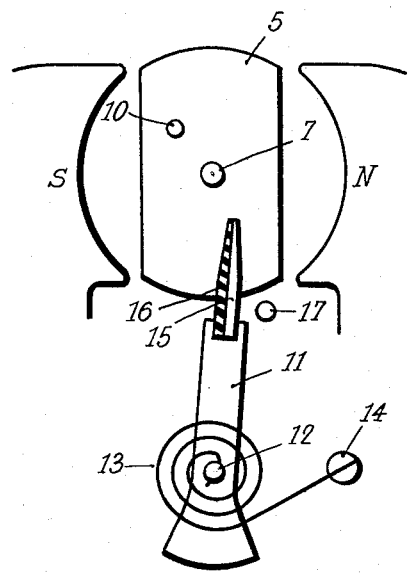
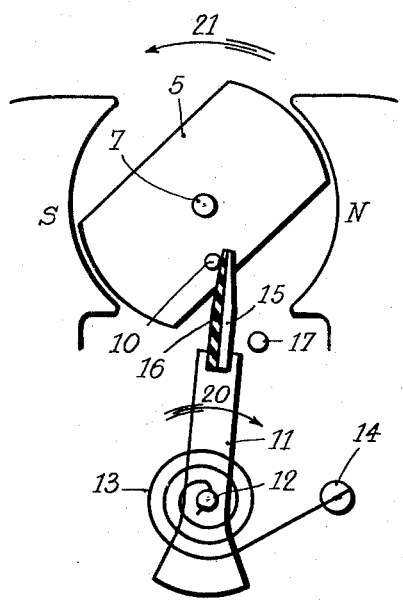
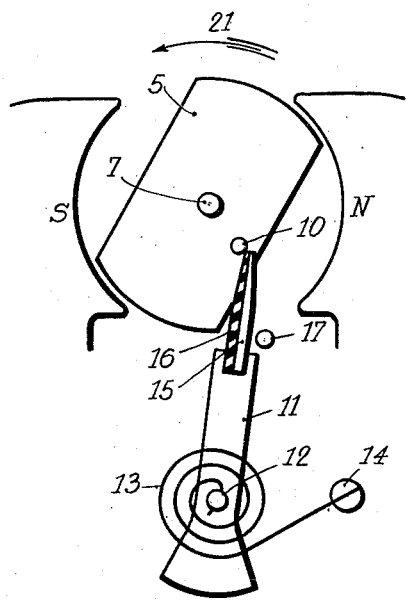

UNITED STATES PATENT OFFICE 2,671,864

ELECTROMAGNETIC OSCILLATORY MOTOR

Paul Dargier de Saint Vaulry, Chatou, France, assignor to Lip S. A. d'Horlogerie, Besancon (Doubs), France Application December 22, 1949, Serial No. 134,415

Claims priority, application France July 27, 1949

3 Claims. (Cl. 310—39)

The arrangement proposed heretofore for keeping up electromagnetically the movement of elastic balance-wheels as used in time keepers required generally the use of the attractive force exerted by an electro-magnet on a member rigid with the balance wheel and made of mild steel.

These arrangements show the drawback of using only a small portion of the magnetic flux produced in the core of the electro-magnet.

The efficiency of these arrangements is still further decreased through the delaying action of the remanent induction in the core of the electro-magnet.

The main feature of the present invention consists in forming a closed magnetic circuit constituted by the core of the electro-magnet stator between the pole pieces of which may rock a so-called oscillator member rigid with the elastic balance wheel and made of magnetically permeable material, the gap existing between the stator and the oscillator being reduced as much as possible so as to diminish the reluctance of the magnetic circuit thus formed.

A further feature of the invention consists in producing in the magnetic circuit a demagnetizing field the part played by which resides in cancelling the remanent induction that might brake the movement of the oscillator as a consequence of the reduction in the gap existing between the stator and the oscillator.

In order that the invention may be readily understood, it is illustrated in its application to a clockwork by way of an example and by no means in a limiting sense, reference being made to accompanying drawings, wherein Figs. 1 and 1a illustrate an arrangement according to the invention in elevational and sectional views respectively.

Figs. 4, 5, 6, 7, 8, 9, 10 are diagrammatic showings of the successive positions occupied by the oscillator. The stator (Fig. 1) that is made of a metal permeable to the magnetic flux is illustrated with its pole pieces N—S and includes one or more magnetizing coils 1 and 2 inside which flows the current producing the magnetizing field.

Figure 1:
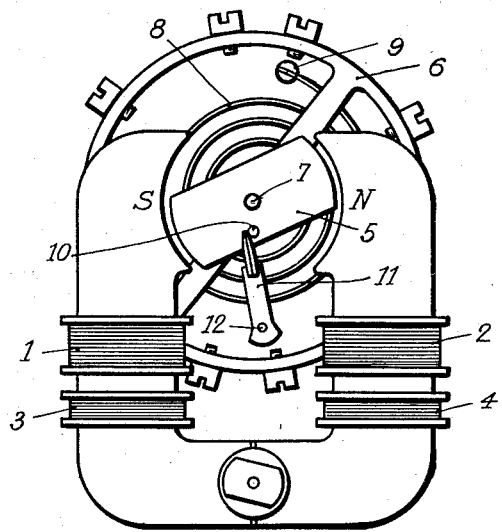
Figure 1A:
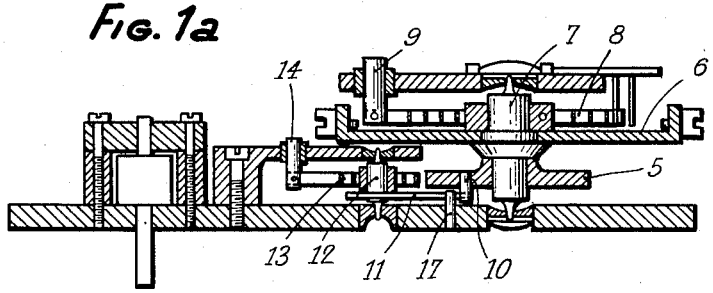

It also includes one or more demagnetizing coils 3 and 4 inside which flows the current producing the demagnetizing field. Between the pole pieces N—S of the stator (Fig. 1) is positioned the oscillator 5 rigid with the balance-wheel 6 and having the same axis 7 as the latter.

The balance-wheel 6 includes a hair-spring 8 one end of which is secured to the axis of the balance-wheel through means generally used in the technique of clockworks; the other end of the hair- spring is secured to a stationary pin 9 electrically insulated with reference to the plate of the clockwork.

To the oscillator 5 is secured eccentrically a pin 10 of inoxidisable metal the axis of which is parallel to the axis 7 of the balance-wheel.

Figure 2:
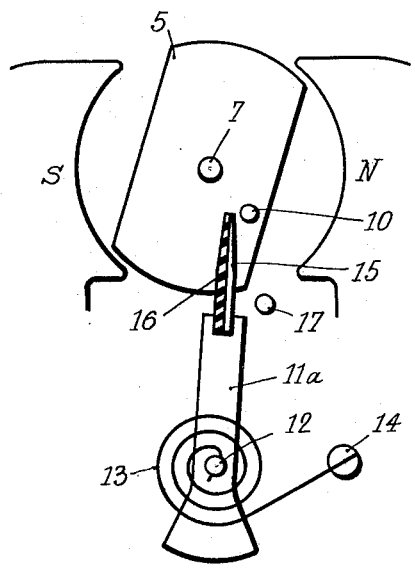
Fig. 2 is a diagrammatic showing of the actual switch.

Said pin 10 may come into contact with the switching projection 11 also made of inoxidisable metal and the detail structure of which is shown in Fig. 2. Said switching member (Fig. 2) includes a body 11a of an electrically conductive metal adapted to move round the spindle 12 parallel with the axis 7 of the balance-wheel.

To the spindle 12 is secured through any known method an auxiliary hair-spring 13 the free end of which is secured to a stationary pin 14 that is electrically insulated with reference to the plate of the clockwork.

To one end of the body 11a of the switching member are fitted two small plates 15 and 16 made respectively of inoxidisable metal and of a material that is not electrically conductive. Said switching member 11 may come into contact through rotation round the spindle 12 either with the movable pin 10 carried by the oscillator 5 or with the auxiliary pin 17 carried by the clockwork plate.

Figure 3:
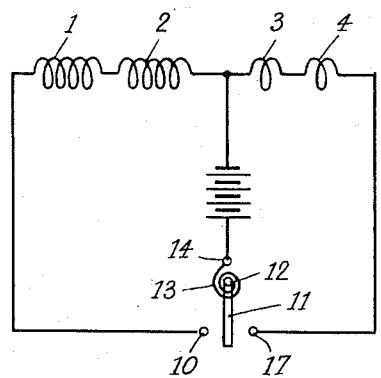
Fig. 3 is a wiring diagram.

The electrical connections may be executed as disclosed in the wiring diagram of Fig. 3 in order to provide selectively the energization of the magnetizing coils 1—2 and of demagnetizing coils 3—4.

Figure 4:
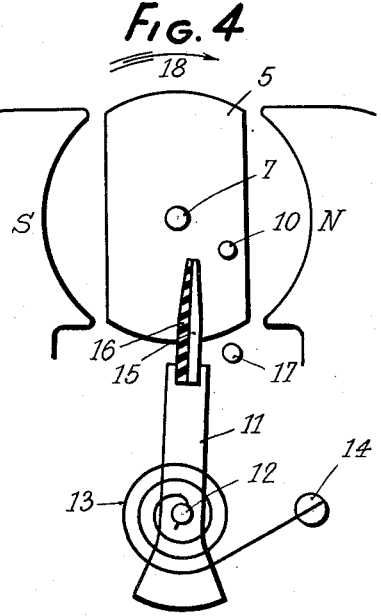

The operation is as follows:

Fig. 4 illustrating diagrammatically a first position of the oscillator rotating in the direction of the arrow 18, the switch 11 that is then supposed to be in its position of equilibrium does not come into contact either with the pin 10 or with the pin 17.

Figure 5:
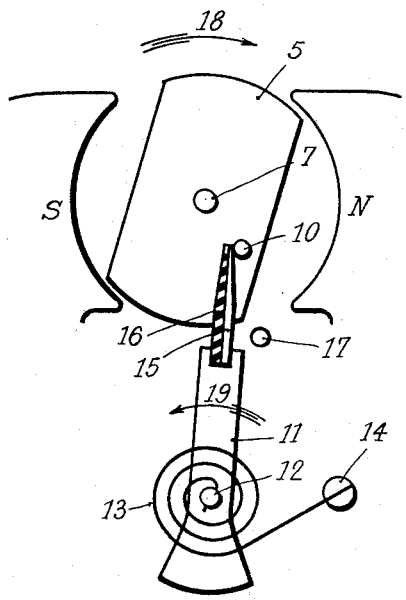
Figure 6:
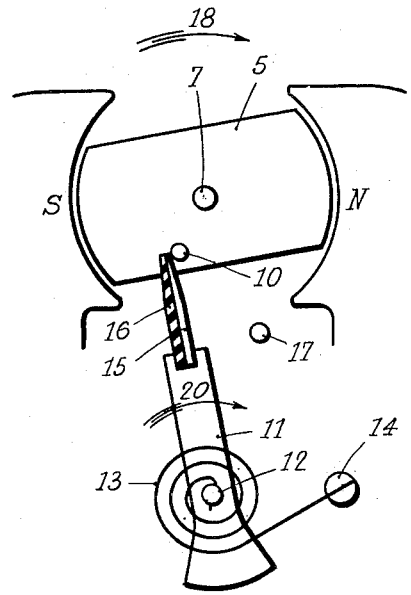

When the oscillator reaches the position illustrated in Fig. 5, the pin 10 secured to it comes into contact with plate 15 of the switching member or projection and causes the latter to rock round its spindle 12 in the direction of the arrow 19 until it reaches the position illustrated in Fig. 6.

The contact between the switching projection and the pin 10 allows at the same time the current to flow through the magnetizing coils 1 and 2.

When the oscillator reaches the position illustrated in Fig. 6, the pin 10 releases the plate 15 and continues its rocking movement in the direction of the arrow 18 until it reaches its extreme outer position.

During this time, the switching projection submitted to the action of the hair-spring 13 rocks in the direction of the arrow 20 round its spindle 12, i. e. in the direction opposed to its preceding movement until the small plate 15 impinges against the stationary pin 17 (Fig. 7).

The contact between 15 and 17 allows the passage of current during a very short time through the demagnetizing coils 3 and 4. The switching projection 11 returns then after a few oscillations that are rapidly damped into its position of equilibrium as shown in Fig. 8.

When the oscillator has reached its extreme outer position as shown in Fig. 8, it is returned by the hair-spring 8 of the balance wheel in the direction of the arrow 21 together with said balance wheel so as to enter the position illustrated in Fig. 9.

When it has reached the position illustrated in said Fig. 9, the pin 10 comes into contact with the insulating plate 16 of the switching projection so as to make the latter rock in the direction of the arrow 20 until said projection reaches the position illustrated in Fig. 10, for which the pin 10 releases the plate 16 on the switching projection.

This is obtained before the latter has reached the stationary pin 17.

The switching member returns then into its neutral position of equilibrium under the action of its hair-spring 13.

During this time, the oscillator continues oscillating and the cycle of operation of the switching projection begins over again when the oscillator moves back and again reaches the position illustrated in Fig. 5.

What I claim is:

1. An arrangement for keeping up the impulses of a balance wheel through magnetic impulses, comprising a stationary electromagnet, a first magnetizing circuit for said electromagnet, a second demagnetizing circuit for said electromagnet and means for selectively energizing each of said first and second circuits in succession during a part of the forward movement of the balance wheel and at a later period of said forward movement respectively, said means including a pivoting switch member adapted to rock about an axis parallel with that of the balance wheel, a hair spring urging said pivoting member into a position extending in a direction substantially radial with reference to said balance wheel, two small plates extending axially of the pivoting member towards the center of the balance wheel, one of said plates facing one side of the arrangement and being conductive and electrically connected with both of said circuits and the other of said plates being insulating, a stationary first stud inserted in said demagnetizing circuit and facing said conductive plate to close and break said demagnetizing circuit whenever said first stud is engaged and disengaged by the pivoting member, and a second stud rigid with the oscillator and inserted in said magnetizing circuit to close same over said conductive plate and adapted to sweep past the tips of both plates to urge either plate into a corresponding direction of rotation therewith, with said second stud contacting the conducting plate on said pivoting member during a portion of the forward rotation of the balance wheel thereby closing said magnetic circuit, after which said second stud releases the pivoting member and allows it to return for temporary engagement with said first stationary stud under the action of the said hair spring thereby closing said demagnetizing circuit, and, said second stud being in contact with said insulating plate on the pivoting member during a portion of the return rotation of the balance wheel.

2. An arrangement for keeping up the impulses of a balance through magnetic impulses, comprising a rotatable spindle for the balance, a stationary electromagnet including a polar system located to either side of the spindle of the balance and separate coils cooperating with said polar system for respectively magnetizing and demagnetizing the polar system, an oscillator rigid with the spindle of the balance and adapted to assume an alternating rocking movement in unison with said balance inside the polar system, a common electric supply for the magnetizing and demagnetizing coils, a switch member electrically connected with said supply and adapted to pivot round an axis parallel with the spindle of the balance, two studs one of which is carried by the oscillator and the other of which is stationary, said studs being electrically connected respectively with the magnetizing and the demagnetizing coils and adapted to close respectively a circuit over said magnetizing coils and said demagnetizing coils through alternating engagement of the pivoting switch member with either stud, a hair spring urging the switch member into a position spaced with refernce to the stationary stud, the rocking of the oscillator periodically causing the stud thereon to engage the switch member and to release same and to allow it to rock into transient engagement with the second stud.

3. An arrangement for keeping up the impulses of a balance through magnetic impulses comprising a rotatable spindle for the balance, a stationary electromagnet including a polar system located to either side of the spindle of the balance, and separate coils cooperating with said polar system, for respectively magnetizing and demagnetizing the polar system, an oscillator rigid with the spindle of the balance and adapted to assume an alternating rocking movement in unison with said balance inside the polar system, a common electric supply for the magnetizing and demagnetizing coils, a switch member electrically connected with said supply and adapted to pivot round an axis parallel with the spindle of the balance, one side only of said switch member having a conductive surface, two studs, one of which is carried by the oscillator and the other of which is stationary, said studs being electrically connected respectively with the magnetizing and with the demagnetizing coils and adapted to close respectively a circuit over said magnetizing coils and said demagnetizing coils through alternating engagement of the pivoting switch member with either stud, a hair spring urging the switch member into a position spaced with reference to the stationary stud, the rocking of the oscillator periodically causing the stud thereon to engage the switch member through its conductive surface and to release same and to allow it to rock into transient engagement with the second stud through its conductive surface.

PAUL DARGIER DE SAINT VAULRY.

References Cited in the file of this patent

UNITED STATES PATENTS

| Number | Name | Date |
|---|---|---|
| 345,292 | Fenner | July 13, 1886 |
| 2,008,338 | Rodanet | July 16, 1935 |

FOREIGN PATENTS

| Number | Country | Date |
|---|---|---|
| 673,634 | France | Oct. 8, 1929 |